United States Patent
Underdahl et al.

(10) Patent No.: US 7,340,332 B2
(45) Date of Patent: Mar. 4, 2008

(54) FLEET TRACKING SYSTEM WITH REPORTING FEATURE

(76) Inventors: Craig T. Underdahl, 2132 Rocky Creek Dr., NE., Rochester, MN (US) 55906; Ronald Amundson, 1242 Richland Ave., St. Charles, MN (US) 55972

(*) Notice: Subject to any disclaimer, the term of this patent is extended or adjusted under 35 U.S.C. 154(b) by 0 days.

(21) Appl. No.: 11/423,089

(22) Filed: Jun. 8, 2006

(65) Prior Publication Data

US 2006/0229780 A1 Oct. 12, 2006

Related U.S. Application Data (63) Continuation-in-part of application No. 10/339,917, filed on Jan. 10, 2003, now abandoned, which is a continuation-in-part of application No. 10/105,209, filed on Mar. 25, 2002, now Pat. No. 6,937,138.

(51) Int. Cl.
    *G01M 17/00* (2006.01)
(52) U.S. Cl. .......................................... 701/35; 701/33
(58) Field of Classification Search .................. 701/1, 701/25, 29, 32, 33, 35, 207, 213; 340/438, 340/439
See application file for complete search history.

(56) References Cited

U.S. PATENT DOCUMENTS

| | | | | |
|---|---|---|---|---|
| 5,957,986 | A | * | 9/1999 | Coverdill ...................... 701/35 |
| 6,253,129 | B1 | * | 6/2001 | Jenkins et al. ................. 701/29 |
| 7,117,075 | B1 | * | 10/2006 | Larschan et al. ............. 701/35 |

* cited by examiner

*Primary Examiner*—Richard M. Camby
(74) *Attorney, Agent, or Firm*—Bockhop & Associates, LLC; Bryan W. Bockhop (57) ABSTRACT

In a method of tracking usage habits of a vehicle having a standard vehicle data port, in which a user identification, a start date, a start time, and a start odometer reading are recorded a local vehicle data storage medium upon receipt of an authorized user identification. A shutoff date, a shutoff time and a shutoff odometer reading are recorded in the local vehicle data storage medium upon sensing engine shutoff. A request for vehicle usage information is received from an off-board data storage device. In response thereto the user identification, the start date, the start, the start odometer reading, the shutoff date, the shutoff time and the shutoff odometer reading are transmitted from the local vehicle data storage medium to the off-board data storage device. A report that includes the user identification, the start date, the start, the start odometer reading, the shutoff date, the shutoff time and the shutoff odometer reading, is transmitted from the off-board data storage device to a remote computer, via a global computer network.

12 Claims, 6 Drawing Sheets

| USER | UID | VEHICLE | TIME/DATE | DIST | SPD | FLAG |
|---|---|---|---|---|---|---|
| Bach, John | 1234 | GNX 723548 | 154202042006 | 23.4 | 63 | - |
| Britten, Ben | 1242 | DAW125896 | 164002102006 | 11.8 | 65 | - |
| Bruckner, Tony | 1235 | ARL526987 | 112502122006 | 17.6 | 55 | - |
| Chopin, Fred | 1237 | PCV358947 | 136502232006 | 1135.4 | 67 | DST |
| Elgar, Ed | 1236 | QWI159874 | 215602142006 | 10.6 | 62 | - |
| Handel, George | 1239 | LGD258654 | 100602182006 | 29.2 | 86 | SPD |
| Liszt, Frank | 1238 | AUE745896 | 084502052006 | 53.2 | 65 | - |
| Schumann, Clara | 1240 | ICJ1593577 | 142302272006 | 37.0 | 59 | - |
| Williams, Ralph | 1241 | MDY456982 | 115302222006 | 43.2 | 64 | - |

FIG. 12

FLEET TRACKING SYSTEM WITH REPORTING FEATURE

CROSS-REFERENCE TO A RELATED PATENT APPLICATION

The present application is a continuation-in-part of U.S. patent application Ser. No. 10/339,917, filed on Jan. 10, 2003 now abandoned, which is a continuation-in-part of U.S. patent application Ser. No. 10/105,209, filed on Mar. 25, 2002 U.S. Pat. No. 6,937,138, the entirety of which incorporated by reference herein.

BACKGROUND OF THE INVENTION

1. Field of the Invention

The present invention relates to automotive electronic systems and, more specifically, to a system for tracking usage habits in a vehicle.

2. Description of the Prior Art

Automobile dealerships and other transportation related organizations must maintain a constant effort to prevent the theft of vehicles. Additionally, dealerships have a problem keeping up with the keys to the vehicles and supplying them for the respective vehicles when needed. Typically, the keys to a vehicle are kept in a common location of a dealership showroom or are kept at the vehicle in a local lockbox that is attached to the vehicle. There are several advantages to having the keys at the vehicle in terms of convenience for both the dealership staff and the customer. For example, a dealership is likely to make more sales if the keys can be kept at the vehicle, as prospective customers have less time to reconsider their buying decisions. Also, storing a plurality of keys in a common location to which several different people have regular access increases the likelihood that the keys will become disorganized.

The local lockbox approach also has several disadvantages. For example, a car thief can spray a refrigerant into the lock of the lockbox to make it brittle and then shatter the lock by striking it with a hammer. Also, if the keys necessary to open the local lockboxes are lost or stolen, then the security of the vehicles is compromised. Thus, if a dealership employee leaves the employ of the dealership without returning his lockbox keys, then every lock must be replaced at a considerable cost to the dealership. Furthermore, a local lockbox attached to a vehicle makes the vehicle look less attractive to the buyer, and may even damage the finish of the vehicle.

Some dealerships unlock all of the vehicles on the lot in the morning and then re-lock the vehicles at night. This allows potential buyers to examine the insides of the vehicles at will during normal business hours. However, unlocking every vehicle is a labor-intensive process that ties up a considerable amount of dealership staff time.

Many modern vehicles are equipped with remote door lock controls. The user is supplied with a remote transmitter that allows for locking and unlocking of vehicles at the press of a button. However, the use of existing remote devices does not overcome the difficulties experienced with dealerships because each remote transmitter must be tuned to respond to a unique code to prevent unauthorized access to the vehicles. Thus, the dealership staff must spend unnecessary overhead in organizing the remote transmitters.

Typical methods of determining the productivity of automobile salespeople have included estimates of clients seen, vehicles shown, quotes, and monthly sales volume. While sales volumes and quotes are easy to access, the number of clients and vehicles shown has relied on the sales persons memory and attention to detail. Like many other professional sales people, such activities take a lower priority than selling, and are often inaccurate and rushed through in order to prepare for sales meetings.

Modern automotive vehicles are commonly equipped with multiple-access serial data communications networks to enable data transfers between various electronics within the vehicle. The Society of Automotive Engineers (SAE) has established a Standard J1850 Class B data communications network that has become widely accepted throughout the automotive industry. The standard SAE J1850 is a set of technical requirements and parameters that specify the use of symbols for communicating serial data over a communications bus.

The SAE J1850 network is used on all US vehicles manufactured since 1996. There are a number of variations, specifically VPW, PWM, and ISO 9141, plus manufacturer and model specific variations. The standard does call out specific access codes for major vehicle systems, the variations are more for additional systems such as air bags, ABS, vehicle navigation, model specific security systems such as key transponders and rolling codes. Advantages of the SAE J1850 interface include: they provide a standardized connector for all vehicles and variations; a connection scheme is simplified; they provide high security as, one would need an expensive scan tool and knowledge of it operation to access a SAE J1850 system; they provide access to the vehicles VIN, odometer, speedometer, lock system, ignition on time; a simplified locking shackle may be used for the standardized connector; and installation of connecting devices is relatively easy, as the connector is readily accessible from the drivers seat.

Many company or fleet vehicles are used for personal purposes. Currently there are no systems available to track personal mileage, and the fleet operator is dependent upon reports by the user to determine the amount of personal mileage driven. In addition, there is no way to determine the whether the vehicle was driven at excessive speeds. The trucking industry has used data-loggers and chart recorders for years to monitor driver performance, but there is no universal data-logger for passenger cars. Some auto-makers include data-logging as an option to a vehicle control system, but those systems are model specific.

Parents are very concerned with the driving characteristics of their children. Young drivers often ignore automobile safety rules, such as speed limits. Parents of young drivers are unable to monitor the driving habits of their children when the are not riding with them.

Certain existing systems include devices that plug in to an onboard diagnostic port of a vehicle and employ a memory module to record operating parameters of the vehicle. A memory module is plugged into the onboard diagnostic port to store the parameters and then plugged into a computer to retrieve the information stored in the module. Such systems do not generate specific reports that are accessible to fleet managers via a global computer network. Also, such systems do not evaluate usage parameters an flag abnormal driving parameters so as to allow a fleet manager to detect abnormal driving habits (such a speeding or using a vehicle for personal use).

Therefore, there is a need for a system and method of tracking usage habits of an operator of a vehicle that may be installed easily in a variety of vehicle types and that generates remotely-accessible reports that alert a fleet manager to abnormal driving habits.

SUMMARY OF THE INVENTION

The disadvantages of the prior art are overcome by the present invention which, in one aspect, is a method of tracking usage habits of a vehicle having a standard vehicle data port, in which a user identification, a start date, a start time, and a start odometer reading are recorded a local vehicle data storage medium upon receipt of an authorized user identification. A shutoff date, a shutoff time and a shutoff odometer reading are recorded in the local vehicle data storage medium upon sensing engine shutoff. A request for vehicle usage information is received from an off-board data storage device. In response thereto the user identification, the start date, the start, the start odometer reading, the shutoff date, the shutoff time and the shutoff odometer reading are transmitted from the local vehicle data storage medium to the off-board data storage device. A report that includes the user identification, the start date, the start, the start odometer reading, the shutoff date, the shutoff time and the shutoff odometer reading, is transmitted from the off-board data storage device to a remote computer, via a global computer network.

In yet another aspect, the invention is a method of tracking performance of a vehicle salesperson with respect to a plurality of vehicles, where each vehicle includes a standard vehicle data port. A salesperson identification is read from a salesperson-specific identification device. The identification input is stored in a vehicle-specific data storage medium. Odometer and speed data is received from the standard vehicle data port during a predetermined period after reading the identification input. A start time and an end time for the predetermined period and a preselected set of the odometer and speed data is stored in a data storage medium. The start time and end time and the preselected set of the odometer and speed data and an identification of the vehicle is transferred to the data reading device in response to a query from a data reading device. A report indicating at least one performance factor relative to the vehicle salesperson based on at least a preselected subset of data received by the data reading device is generated.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." "Global computer network" includes the Internet.

Figure 1:
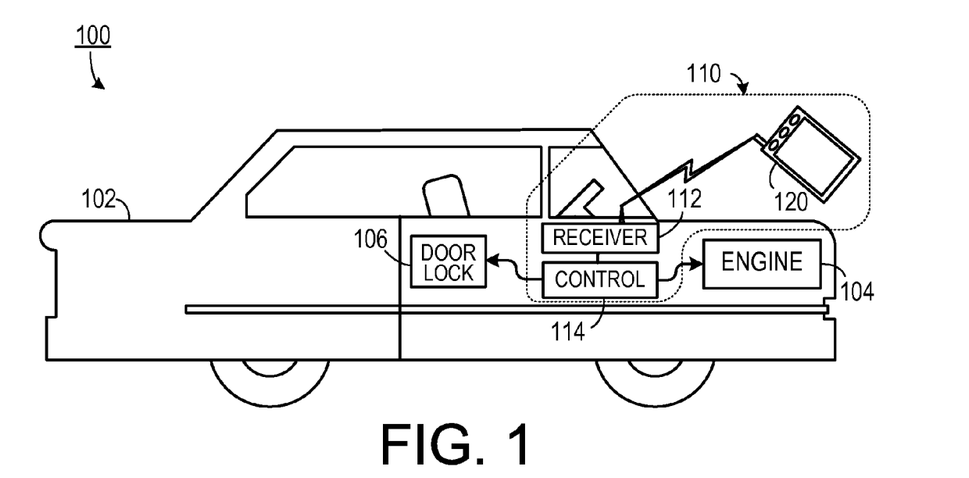
FIG. 1 is a. schematic drawing of an illustrative embodiment of the invention, as applied to a single vehicle.
Figure 2:
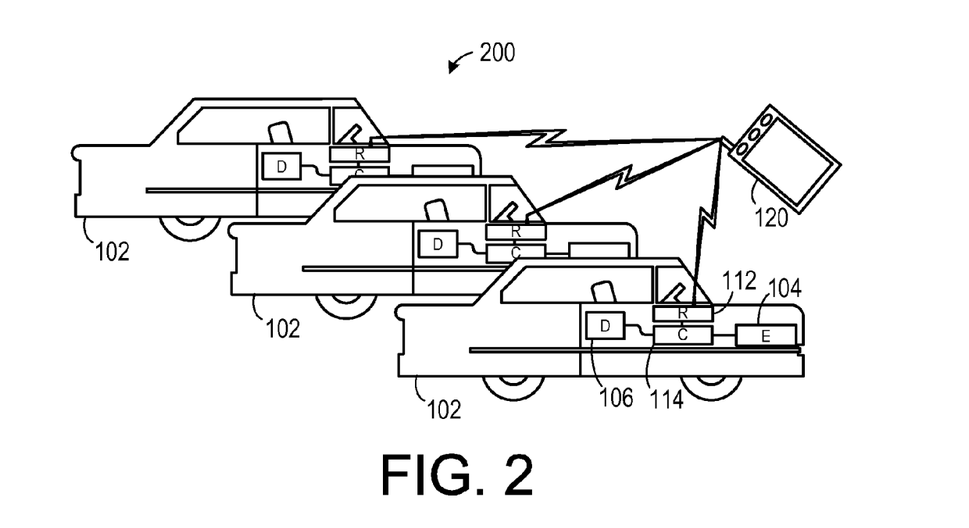
FIG. 2 is a schematic drawing of an illustrative embodiment of the invention, as applied to a plurality of vehicles.

As shown in FIG. 1, one embodiment of the invention 100 is a vehicle 102 that includes an engine 104 and an automatic door locking system 106. A removable door lock control apparatus 110 allows a salesperson at a dealership to control the door lock status. The removable door lock control apparatus 110 includes a signal sensor 112 and a control unit 114 that is responsive to the signal sensor 112. The signal sensor 112 is capable of receiving signals from a transmitter 120. The control unit 114 is capable of controlling the door locking system 106 so that when the signal sensor receives a predetermined signal (such as a specific code) from the transmitter 120, the control unit 114 causes the door locking system 106 to change the door lock state of at least one door of the vehicle 102. For example, if the door lock state for all doors of the vehicle is "locked," then the salesperson could activate the transmitter 120, thereby causing the door to become "unlocked." The control unit 114 may also be coupled to the engine 104 of the vehicle 102, so that upon changing the door lock state to "locked," the engine will be disabled, thereby providing a theft deterrent. As shown in FIG. 2, the door locks 106 of each vehicle 102 of a plurality of vehicles 200, such as at an automobile dealership, may be controlled by a single transmitter 120.

Typically, the keys for a vehicle 102 are locked in the vehicle 102, such a in the glove compartment, on the sales lot. When a customer wishes to take a test drive, the salesperson activates a transmitter 120, thereby unlocking at least one door of the vehicle 102 and the keys are retrieved from the glove compartment. Once the test drive is completed, the keys are returned to the glove compartment and the salesperson relocks the vehicle 102 by actuating the transmitter 120.

Several different types of receiver 112 may be employed. For example, the receiver 112 could be an infra-red sensor. An infra-red system has the advantages of low cost and high selectability. Thus, if a salesperson desires to open only one vehicle, the salesperson could apply the transmitter 120 to the window of the desired vehicle and only that vehicle would become unlocked. Another type of system that has high selectability is a capacitive coupling communication device. Several devices, in which the receiver 112 extends outside the vehicle 102 may be used. These include: a physical plug to which the salesperson attaches the transmitter 120; a magnetic strip reader that allows access when a salesperson applies a card with a magnetic strip (the card being the transmitter); a bar code reader (in which case a bar coded card is used as the transmitter); and even a biometric sensor, such as a finger print scanner. If the transmitter 120 emits a code that uniquely identifies the salesperson to which the transmitter 120 is assigned, then the system may keep an audit trail of each entry into the car by each salesperson, which may be useful in assessing employee habits. Generally, for broadcast-type receivers (e.g., infrared, radio frequency, etc.) the power level of the transmitter 120 should be low enough to require the transmitter 120 to be in close proximity to the vehicle 102 so that only one vehicle at a time will be responsive to the signal from the transmitter 120.

If the dealership wishes to be able to lock and unlock all of the vehicles simultaneously, then the receiver 112 could be a radio-frequency sensor. In such a case, the transmitter 120 could be a local radio-frequency transmitter, or could even be part of a satellite-based system (which could, for example, be activated by accessing a global computer network site).

Figure 3:
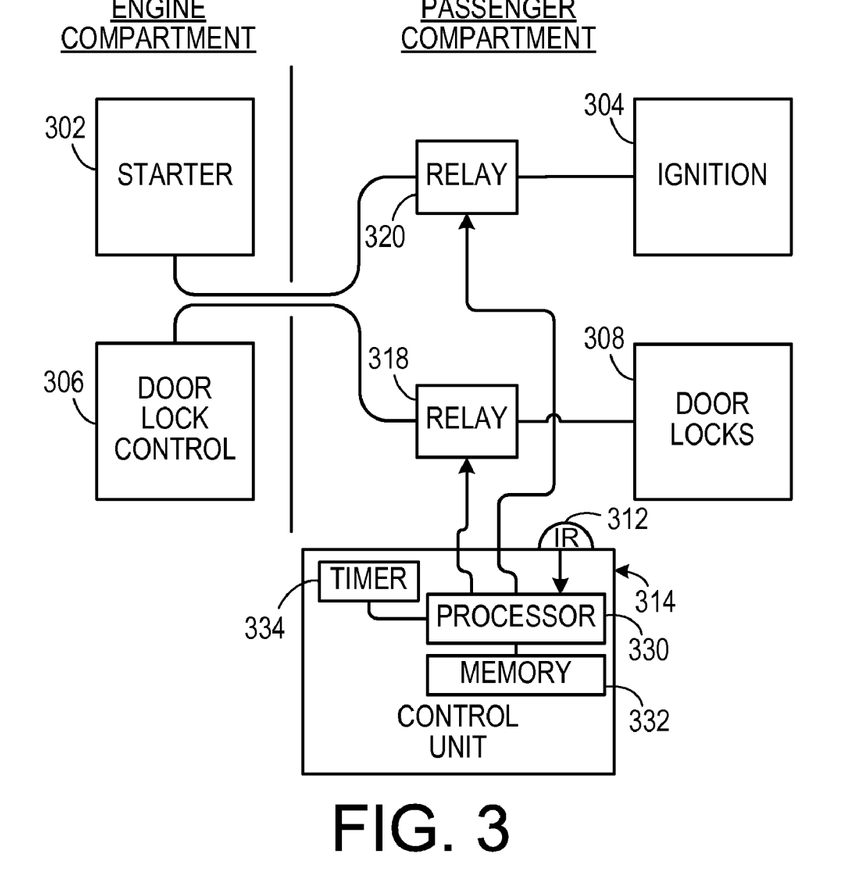
FIG. 3 is a block diagram of an embodiment of the invention that is applied to the ignition and door lock control systems of a vehicle.

As shown in FIG. 3, the control unit 314 may be coupled to the door locking control system of the vehicle by placing a first controllable switch 318, such as a relay, between the vehicle's installed door lock control unit 306 and the door lock actuator 308 inside the door panel of the vehicle. The first controllable switch 318, which is controlled by the control unit 314, may be controlled to apply power to the door lock actuator 308 to cause a change in state of the door lock. A second controllable switch 320 may be placed between the ignition 304 and the starter 302 to disable the starter 302. The control unit 314 keeps track of the locked state of the door lock and disables the starter 302 whenever the door lock is in the locked state. The control unit 314 could include a processor 330 such as a dedicated microprocessor, a programmable logic controller or any one of the many other types of programmable controllers that are generally known in the art of electronic control circuit design.

When a salesperson leaves the dealership, the codes to which the control unit 314 responds must be changed. This may be done by inputting a supervisor code to the signal sensor 312, or through a separate dedicated data entry port (which could be a hard wired port connected to the control unit 314). The supervisor code is compared to the data in a first memory location in the processor memory 332 and, if they match, then the user is able to input a new code into a second memory location in the processor memory 332. The code in the second memory location is the code to which the control unit will respond for changing the door lock states. The supervisor code and the new code could also be input through a separate receiver, such as a radio-frequency receiver, with the new code being input to a plurality of vehicles simultaneously.

Occasionally, the salesperson will forget to re-lock a door after taking a customer on a test drive. Therefore, the control unit 314 may be programmed to include a timer 334 that counts a predetermined amount of time from the last time that the door was unlocked. After the expiration of the predetermined time, if the vehicle has been inactive, the control unit 314 will cause the doors of the vehicle to lock and the starter to become disabled.

Figure 4:
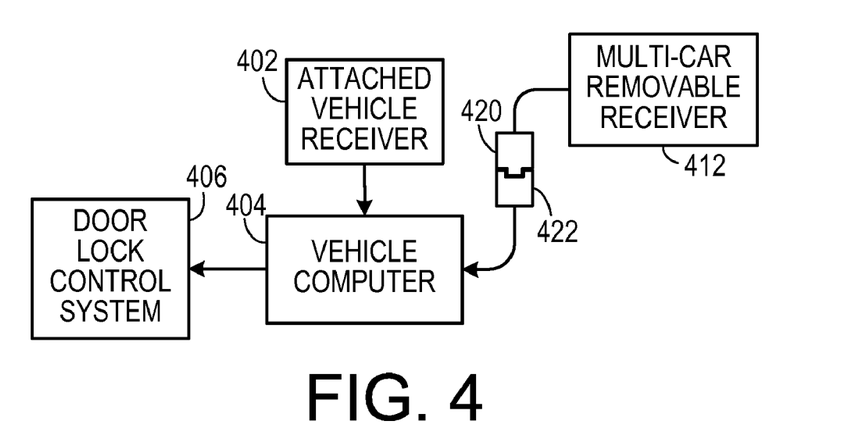
FIG. 4 is a block diagram of an embodiment of the invention that is applied to a dedicated port of a computer used to control certain features of a vehicle.

An installed system is shown in FIG. 4, in which the invention is embedded in the on-board computer system 404 of the vehicle. In this embodiment, the computer system 404 already controls the door lock control system 406 so that only an additional data port 422 need be added to the computer system 404. The data port 422 is coupled to a multi-car removable receiver 412 while the vehicle is at the dealership. Once the vehicle is sold, the multi-car removable receiver 412 is unplugged from the data port 422.

The vehicle may also come with an attached vehicle receiver 402 that allows operation of a keyless entry system by the end user. Therefore, the computer system 404 must be programmed to recognize the difference between a keyless entry system activation code entered through the attached vehicle receiver 402 and a dealership code received by the multi-car removable receiver 412. The computer system 404 may also be programmed to deactivate the attached vehicle receiver 402 when the multi-car removable receiver 412 is in use.

Figure 5:
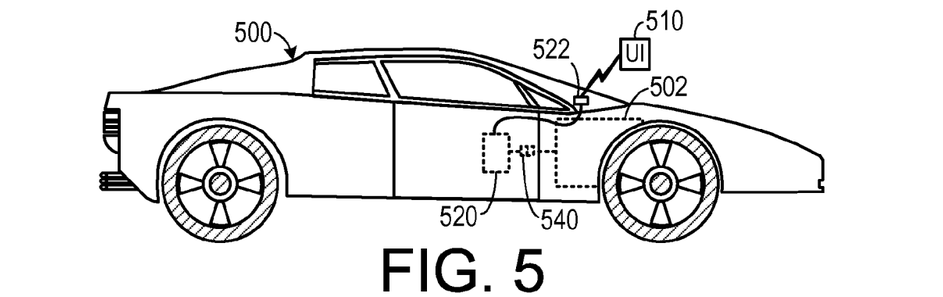
FIG. 5 is block diagram of one embodiment of a vehicle usage data recording system installed in a vehicle.
Figure 6:
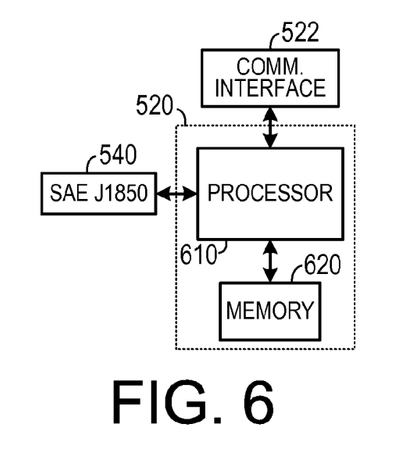
FIG. 6 is a block diagram of one embodiment of a vehicle module and a communications interface.

As shown in FIG. 5, one embodiment of the invention may be installed in a vehicle 500, such as an automobile. A vehicle module 520 is anchored to the vehicle by one of several types of anchors, including a bolt, a clip, use of a nylon cable tie, etc. The vehicle module 520 is coupled to the internal electronic components 502 of the vehicle 500 via a SAE J1850 connector 540. The vehicle module 520 performs the data acquisition, storage and transfer functions of the invention and communicates with a user interface 510 through a communication interface 522. As shown in FIG. 6, the vehicle module 520 includes a processor 610 and a non-volatile memory 620 that performs the data storage function. The invention facilitates connection to any vehicle with a SAE J1850 network, thus providing a standard interface and reporting system across a wide range of vehicles such as common amongst commercial operations. The system offers the advantage of providing a common connection that typically would not require the acquisition of new software and hardware as the vehicles in a fleet change. Also, the system may provide a consistent reporting structure rather than a vendor specific format.

Figure 7:
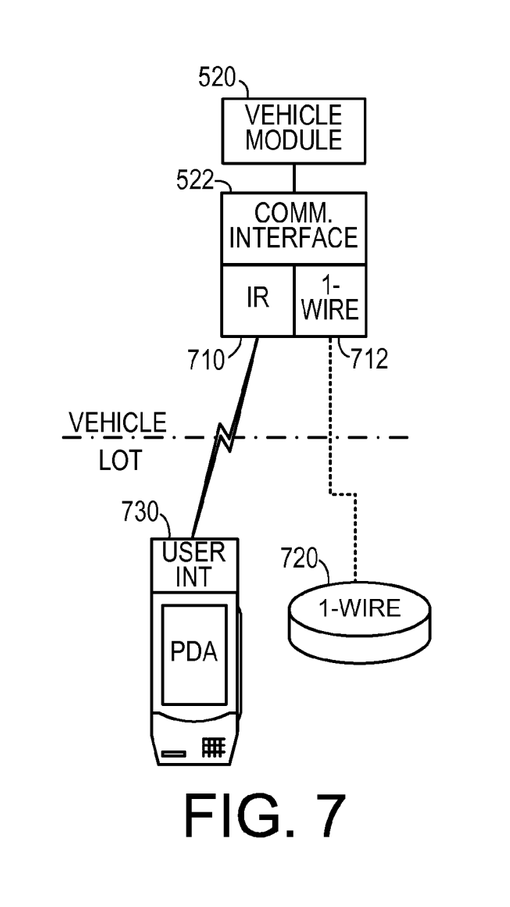
FIG. 7 is a block diagram showing interaction between a communications interface and two communications devices.

As shown in FIG. 7, the communication interface 522 could include one, or both, of an infra-red data transceiver 710 (of the type commonly used to download data from personal data assistants to personal computers) or a one-wire contact data port 712, such as a data port compatible with I Button Technology, available from Dallas Semiconductor Corporation. The infra-red data transceiver 710 facilitates communication between a personal data assistant 731 and the vehicle module 520, whereas the one-wire contact data port 712 facilitates communication with a one-wire type contact data device 720. The one-wire device 720 is a device that initiates a data communication when it is placed against the one-wire contact data port 712. In use, each automobile user has a uniquely-identified one-wire device 720. When starting the vehicle 500, the user places the one-wire device 720 against the one-wire data port 712 and the one-wire device 720 transmits a unique identification of the user to the vehicle module 520 and then data relating to the user's driving habits during the vehicle usage event are stored in the vehicle module 520.

Figure 8:
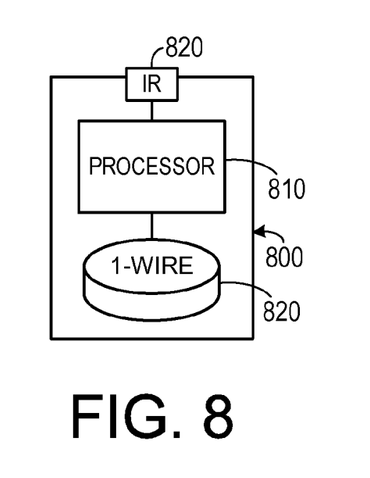
FIG. 8 is a block diagram of a communications device that facilitates sales tracking.

As shown in FIG. 8, a device 800 for transmitting security codes to a vehicle includes a programmable processor 810 that is in data communication with an infra-red transceiver 820 and a one-wire type contact data device 820. The security codes are stored by the vehicle module 520 an are used to limit access to the information stored in the vehicle module 520 only to authorized users.

Figure 9:
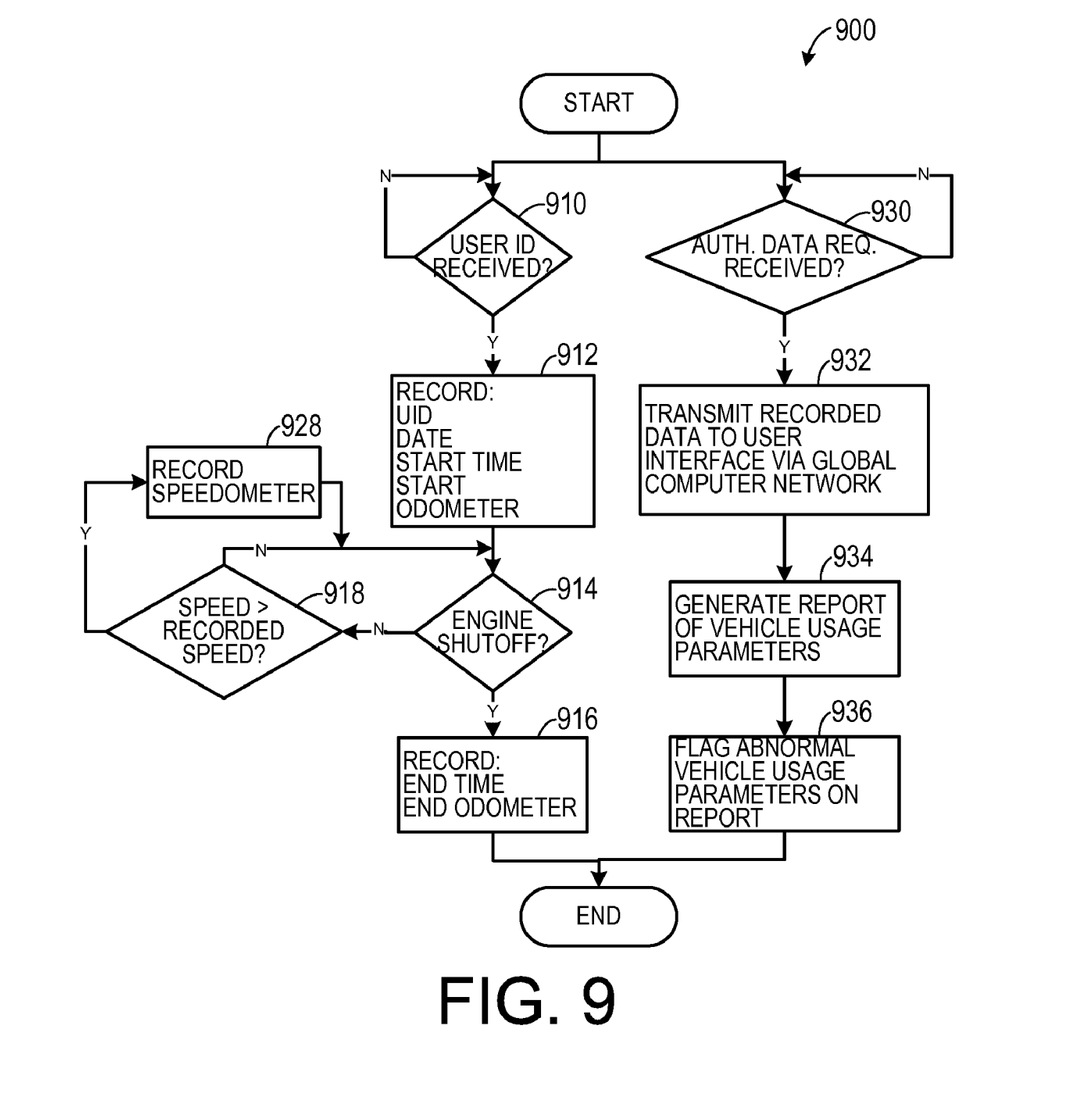
FIG. 9 is a flow chart showing a method according to one embodiment of the invention.

The operation of the system is generally shown in FIG. 9. In the flowchart 900, the system initially waits for either the entry of a valid user identification 910 (e.g., a driver placing a one-wire device against a one-wire data port communication interface of the vehicle) or an authorized data request 930 (e.g., a lot administrator using a PDA to acquire data through an infra-red data transmission).

When a valid user identification 910 is received, the vehicle module records 910 such information as the user's identification, the date, the start time and a starting value of the odometer. This information is acquired from the vehicle through the vehicle's SAE J1850 connection. While the engine is running, the system may test 918 to determine if the vehicle speed has exceeded a previously recorded maximum for the current driving session. If so, then the vehicle module records the new maximum speed 928. This step is not necessary, as the vehicle's average speed can be calculated from the odometer reading and the total run time of the driving session. Once an engine shut-off has been detected 914, the system records 916 the end time, and the end odometer reading.

When an authorized data request is received 930 the system transmits 932, via a global computer network, the information recorded in the vehicle module to a user computer, which is displayed on a user interface or in a print out of a report. The system generates 934 a report that includes usage data relating to each vehicle in a fleet. Any abnormal uses of a vehicle are flagged 936, thereby allowing a fleet manager to detect abnormal uses easily. Uploading data could be done periodically, or it could be done at the end of each use, depending upon the specific application. Once the information has been uploaded, the memory is reset to allow its full capacity to store new data.

Figure 10:
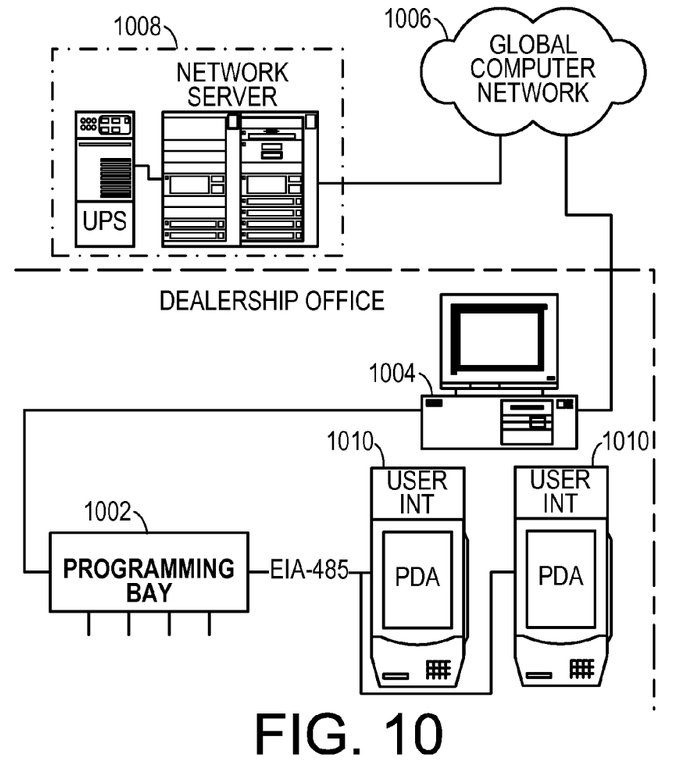
FIG. 10 is a block diagram of an embodiment of the invention that facilitates communication with a network server.
Figure 11:
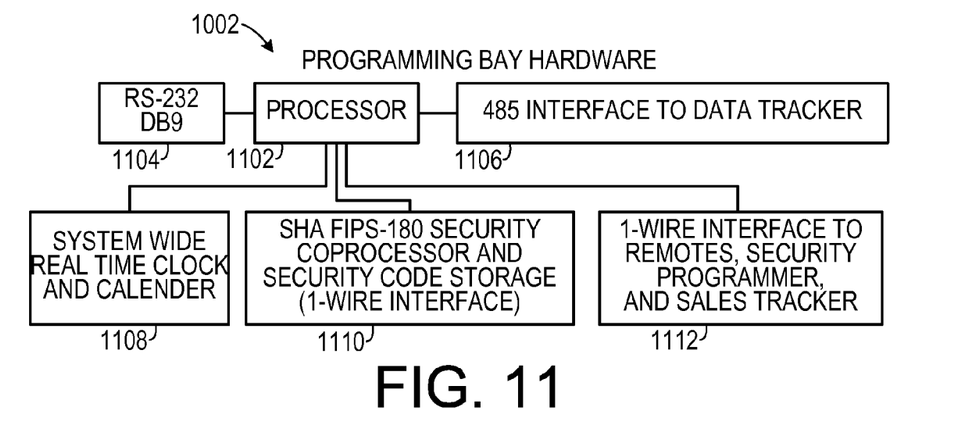
FIG. 11 is a block diagram of a programming bay.

As shown in FIG. 10, the vehicle usage data may be sent to a central server 1008 in communication with a global computer network 1006, such as the Internet. This arrangement may be particularly useful in tracking the usage of large fleets of vehicles that are dispersed over a wide geographic region. A local computer 1004 is in data communication with the global computer network 1006 and a programming bay 1002 that acts to connect the local computer 1004 to the user interface device 1010. As shown in FIG. 11, the programming bay 1002 includes a processor 1102 and a security code generator 1110, such as an SHA FIPS-180 Security Coprocessor and security code storage medium. The processor 1102 communicates with the local computer 1004 through a data port 1104, such as an RS-232 DB9. The processor 1102 also communicates with the user interface devices 1010 via an EIA 485 interface. The processor 1102 also communicates with single wire data devices through a single wire data interface 1112. A real time clock and calendar circuit 1108 (of a type generally known to the art of computer circuits) generates a master date and time reference used system wide. Whenever a user accesses the system, the master date and time is delivered to the user interface device so as to synchronize all of the data events with the real time clock and calendar circuit 1108.

It is anticipated that the invention will find utility in a number of fields, including: tracking of usage habits of individuals having use of a company car (of a fleet of company cars); tracking frequency of usage by vehicle salespeople in a sales lot; minimizing insurance-risk exposure by monitoring employee driving habits; providing a speed log in accident reconstruction; and monitoring teen driving habits.

In tracking company car usage, typically a user would activate the system by contacting a one-wire data device with the the one-wire data port attached to the vehicle. The one-wire data device has a serial number that uniquely identifies the user. Periodically, the user uploads the usage data from the vehicle module to the one-wire device (using the one-wire device as a data transfer medium) and then uploads the data to the global network server 1008. The system can also generate a warning "beep" to indicate that the vehicle module memory is full and needs to have the data uploaded. Alternately, the system can require monthly data retrieval via a handheld retrieval tool by a vehicle fleet manager. The vehicle usage data may be encrypted by the vehicle module and decrypted by the server to prevent tampering with the data.

Parents are very concerned with the driving characteristics of their children. The invention could be used as a system for monitoring ones child's driving style. Rather than a monthly retrieval, a parent can retrieve the data via a handheld reader, such as a personal data assistant, after a child returns home. In one possible scenario, the handheld reader would be connected to the parents' personal computer and the parent can view the speed and duration of the child's excursion. Such information could be used for disciplinary purposes, or as a known deterrent to unsafe driving as the child would be aware that their driving style was being monitored. The SAE J1850 connector could be locked in place to prevent a child from removing it while driving in an unsafe manner. Another possibility for data retrieval is to include a modem within the handheld reader. The parent would then connect the reader to a phone line and the data would be uploaded to a central web site via a dial up connection. Such an approach would lead to ease of use and reduced support issues.

Figure 12:
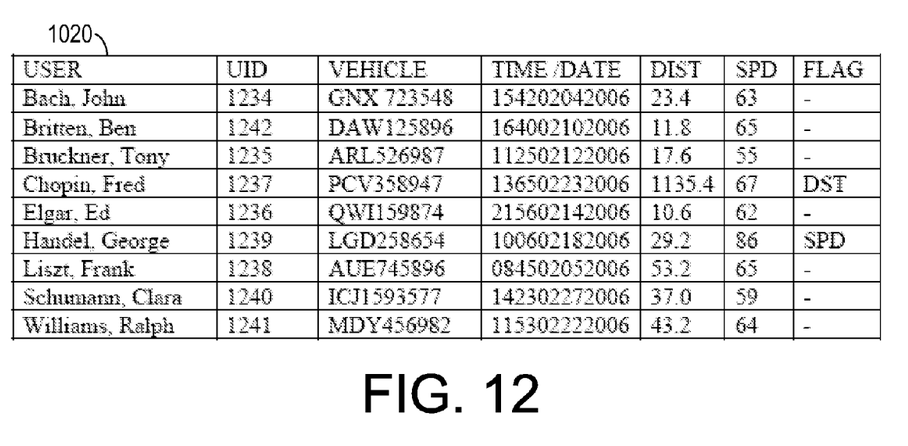
FIG. 12 is a sample of a report generated by one embodiment of the invention.

The global computer network-connected embodiment allows for central generation of driving habit reports. It also allows for remote viewing of such reports, as well as providing the assigned user of a vehicle a medium to enter additional information, such as an indication of which driving events were job related (and, therefore, reimbursable) and which driving events were not job related. As shown in FIG. 12, one example of a report 1020 that could be generated according to one embodiment of the invention, includes a listing of each trip by a driver who has driven a fleet vehicle during a given time period. The report includes a listing of the user, the user's identification code, a vehicle identification, the time and date that the trip was taken, the distance the vehicle drove during the trip (which can be determined by subtracting the shutoff odometer reading from the start odometer reading), the maximum speed attained by the vehicle during the trip and a flag that indicates abnormal parameters for the vehicle. The system can compare the trip distance to a threshold and flag any trip that exceeds the threshold. For example, the report 1020 shows that driver Chopin took a trip of over a thousand miles, whereas the typical trip taken by other drivers is less than one hundred miles and, thus the trip was flagged for excessive distance. The system can also compare the maximum speed during a trip to a speed threshold and flag any trip in which the vehicle exceeded a maximum speed. For example, the report 1020 shows that driver Handel had a maximum speed of 86, which was flagged for excessive speed. Also, the system can add up all the total distance driven by a given vehicle by a specific user to detect personal use of a company vehicle.

The invention makes vehicle usage monitoring and sales tracking invisible to the vehicle user and achieves a high level of accuracy. In addition, because reports may be processed in a central location, artificial tampering to enhance a specific individual's performance is prevented.

In tracking salespersons, vehicle-specific data, such as a vehicle identification number (VIN) may also be stored by the vehicle module. Remotely, information about the vehicle may be stored in a database. Such information could include year, manufacturer, model, body style, color, engine, mileage, and the dealerships inventory control number. Such information could be used in developing reports relative to a salesperson's, or even a dealership's, sales habits and performance. The initial data entry to the vehicle module and server could occur during the dealer preparation phase of accepting a new vehicle, with sales tracking beginning as soon as the vehicle is prepped and put on the sales floor. Every access to the vehicle is logged with the sales persons ID code, time of day, and calendar date, thus saving the sales people from manual tracking their activity. In addition, if the engine is started, a record of engine run time is kept to create reports of test drive duration. By comparing total engine operation time, and mileage at installation and removal, a rough estimate of miles driven per test drive could be inferred. Such a report could be used to identify potential abusers of test drives and any collusion with the sales staff. Upon sale of the vehicle, the vehicle module is disconnected from the SAE J1850 connector, removed from the vehicle, the memory is reset and the module is used again in another vehicle.

In another embodiment, the invention could accomplish via an existing global positioning satellite (GPS)-based tracking system (for example an Onstar® system) as an after-market device. The GPS data is available from the tracking system and is available on the vehicle's network. A GPS system cell phone is also connected to the network. This embodiment reads the GPS data from the GPS system, and then places it in the cell phone's digital header stream. This header stream occurs at the beginning of every cell phone call, and most of it is not used. The data is transmitted without a call being picked up.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A method of tracking usage habits of a vehicle having a standard vehicle data port, comprising the steps of:
   a. upon receiving an authorized user identification, recording in a local vehicle data storage medium a user identification, a start date, a start time, and a start odometer reading;
   b. upon sensing engine shutoff, recording in the local vehicle data storage medium a shutoff date, a shutoff time and a shutoff odometer reading;
   c. receiving a request for vehicle usage information from an off-board data storage device;
   d. in response to the request, transmitting, from the local vehicle data storage medium to the off-board data storage device, the user identification, the start date, the start odometer reading, the shutoff date, the shutoff time and the shutoff odometer reading; and
   e. transmitting from the off-board data storage device to a remote computer, via a global computer network, a report that includes the user identification, the start date, the start odometer reading, the shutoff date, the shutoff time and the shutoff odometer reading.

2. The method of claim 1, wherein the vehicle is a selected vehicle of a fleet of vehicles, further comprising the steps of:
   a. consolidating the report with a plurality of other reports corresponding to other vehicles in the fleet of vehicles; and
   b. generating a combined usage report that lists each vehicle of the fleet of vehicles.

3. The method of claim 2, further comprising the steps of:
   a. identifying any vehicle that has exhibited an abnormal usage characteristic; and
   b. flagging on the combined usage report each vehicle that has exhibited an abnormal usage characteristic.

4. The method of claim 3, further comprising the steps of:
   a. until an engine shutoff of each vehicle is sensed, recording a maximum speed of the vehicle; and
   b. including the maximum speed of the vehicle in the report.

5. The method of claim 4, wherein the identifying step comprises the steps of:
   a. comparing the maximum speed of each vehicle to a threshold speed; and
   b. flagging any vehicle listing in which the maximum speed exceeds the threshold speed.

6. The method of claim 3, further comprising the step of determining a travel distance for each vehicle by subtracting the start odometer reading from the shutoff odometer reading.

7. The method of claim 6, wherein the identifying step comprises the steps of:
   c. comparing the travel distance of each vehicle to a threshold distance; and
   d. flagging any vehicle listing in which the travel distance exceeds the threshold distance.

8. The method of claim 3, further comprising the step of detecting personal use of a vehicle by a user by adding the travel distance of each trip driven by the user during a predetermined period of time.

9. The method of claim 1, further comprising the steps of:
   a. until an engine shutoff is sensed, recording a maximum speed of the vehicle; and
   b. in response to the request, transmitting, from the local vehicle data storage medium to the off-board data storage device, the maximum speed of the vehicle.

10. The method of claim 1, wherein the transmitting step comprises the step of transmitting data to an infra-red data transceiver.

11. The method of claim 1, wherein the transmitting step comprises the step of transmitting data to a one-wire data device.

12. A method of tracking performance of a vehicle salesperson with respect to a plurality of vehicles, each vehicle including a standard vehicle data port, comprising the steps of:
   a. reading, from a salesperson-specific identification device, a salesperson identification;
   b. storing the identification input in a vehicle-specific data storage medium;
   c. receiving odometer and speed data from the standard vehicle data port during a predetermined period after reading the identification input;
   d. storing a start time and an end time for the predetermined period and a preselected set of the odometer and speed data in a data storage medium;
   e. in response to a query from a data reading device, transferring the start time and end time and the preselected set of the odometer and speed data and an identification of the vehicle to the data reading device;
   f. generating a report indicating at least one performance factor relative to the vehicle salesperson based on at least a preselected subset of data received by the data reading device; and
   g. transmitting from the off-board data storage device to a remote computer, via a global computer network, a report that includes the user identification, the start date, the start odometer reading, the shutoff date, the shutoff time and the shutoff odometer reading.

* * * * *